United States Patent [19]
Kauffman

[11] Patent Number: 6,125,351
[45] Date of Patent: Sep. 26, 2000

[54] SYSTEM AND METHOD FOR THE SYNTHESIS OF AN ECONOMIC WEB AND THE IDENTIFICATION OF NEW MARKET NICHES

[75] Inventor: Stuart A Kauffman, Santa Fe, N. Mex.

[73] Assignee: Bios Group, Inc., Santa Fe, N. Mex.

[21] Appl. No.: 09/080,040

[22] Filed: May 15, 1998

[51] Int. Cl.$^7$ ..................................................... G06F 17/60
[52] U.S. Cl. ..................................................... 705/7; 705/6
[58] Field of Search ................................ 705/7, 6; 707/6; 706/45; 364/468.03, 468.07; 341/51

[56] References Cited

U.S. PATENT DOCUMENTS

| | | | |
|---|---|---|---|
| 4,935,877 | 6/1990 | Koza | 364/513 |
| 5,136,686 | 8/1992 | Koza | 395/13 |
| 5,148,370 | 9/1992 | Litt et al. | 364/468 |
| 5,465,204 | 11/1995 | Sekine et al. | 364/152 |
| 5,479,343 | 12/1995 | Matoba et al. | 364/401 |
| 5,552,995 | 9/1996 | Sebastian | 364/468.03 |
| 5,559,710 | 9/1996 | Shahraray et al. | 364/486.06 |
| 5,586,021 | 12/1996 | Fargher et al. | 364/468.06 |
| 5,586,218 | 12/1996 | Allen | 395/10 |
| 5,635,931 | 6/1997 | Franaszek et al. | 341/51 |
| 5,701,400 | 12/1997 | Amado | 706/45 |
| 5,852,560 | 12/1998 | Takeyama et al. | 364/468.03 |
| 5,890,152 | 3/1999 | Rapaport et al. | 707/6 |

FOREIGN PATENT DOCUMENTS

| | | |
|---|---|---|
| 0 399 850 A2 | 11/1990 | European Pat. Off. . |
| 0 407 026 A2 | 1/1991 | European Pat. Off. . |
| 0 411 748 A2 | 2/1991 | European Pat. Off. . |
| 0 434 224 A2 | 6/1991 | European Pat. Off. . |
| WO 97/29443 | 8/1997 | WIPO ............ G06F 17/60 |
| WO 97/44741 | 11/1997 | WIPO ............ G06F 15/18 |
| WO/97/45802 | 12/1997 | WIPO ............ G06F 17/60 |
| WO 98/15909 | 4/1998 | WIPO ............ G06F 17/60 |

OTHER PUBLICATIONS

Sean Baird et al., *MCSE Training Guide, SQL Server™ 6.5 Design & Implementation*, New Riders Publishing, (1997) ("SQL Server™"), Chapter 10.

Harley Hahn, *The Internet, Complete Reference*, McGraw Hill, 1996, Chapter 10.

Kauffman, S., *The Origins of Order*, Oxford University Press (1993), Chapter 10.

Rumbaugh, J., *Objects Oriented Modeling and Design*, Prentice Hall, Inc. (1991), Chapters 1, 3, 17.

Stanley B. Lippman, *C++ Primer*, Addison–Wesley Publishing Company, 2nd edition, (1991), Sect. 1.8.

*Introduction to Physical Design Automation*, The Benjamin/Cummings Publishing Company, Inc. (1988), Chapters 1 and 2.

(List continued on next page.)

*Primary Examiner*—Allen R. MacDonald
*Assistant Examiner*—Forest Thompson, Jr.
*Attorney, Agent, or Firm*—Pennie & Edmonds LLP

[57] ABSTRACT

An economy comprises a relation among agents, goods and services. Each good and service in the economy consists of combinations of more primitive goods and services. Goods and services can be complements or substitutes to other goods and services. Complements are sets of goods or services which are used jointly to produce a given other goods or services. In contrast, substitutes are sets of goods or services which might substitute for one another in a given production technology or consumption good. Complementary goods and services must be used together to create value in the economy. Most goods and services create value in the economy via positive functional interactions with their complements and via competition with their substitutes.

The invention provides a system and method called Economic Web Sherpa which effectively and rapidly gathers data on the functional relations within an economy and which synthesizes an economic web model defining the local structure of the economic relations within the vicinity of a company or other economic agent. Economic Web Sherpa also analyzes the functional structure of the economic web model and generates new goods and services to identify new niches, new growth opportunities and new locations of strategic competition for a company of other economic agent.

57 Claims, 10 Drawing Sheets

OTHER PUBLICATIONS

Preparata and Yeh, *Introduction to Discrete Structures*, Addison–Wesley Publishing Company, Inc. (1973), Chapter 2.

*Introduction to Verity Search Technology*, http://www.verity.com/support.

Henry F. Korth and Abraham Silberschatz, *Database System concepts*, McGraw–hill Book Co., 1986, Chapters, 1, 3, 9 and 12.

Ludwig Wittgenstein, *Philosophical Investigations*, Macmillan, New York, (1968), pp. ixe to 73e.

Sivaram Balasubramanian and Douglas H. Norrie, "A Multi–Agent Intelligent Design System Integrating Manufacturing and Shop–Floor Control", ICMAS, 1995.

Beau Roy, "Using Agents to Make and Manage Markets Across A Supply Web", Complexity, John Wiley & Sons, Inc., vol. 3, No. 4, 1998.

Bill Fulkerson and Gilbert Staffend, Decentralized Control In The Customer Focused Enterprise, Annals of Operations Research 75 (1997) 325–333, 1997.

Toru Ishida, "Parallel, Distributed and Multi–Agent Production Systems: A Research Foundation for Distributed Artificial Intelligence", ICMAS, 1995.

H. Van Dyke Darunak, "'Go the Ant': Engineering Principles From Natural Multi–Agent Systems", Annals of Operations Research 75 (1975) 69–101.

SYSTEM AND METHOD FOR THE SYNTHESIS OF AN ECONOMIC WEB AND THE IDENTIFICATION OF NEW MARKET NICHES

FIELD OF THE INVENTION

The present invention relates generally to a system and method for the synthesis of a model representing an economy of goods and services for economic analysis. More particularly, the present invention creates an economic web model of an economy of goods and services and automates the synthesis of new goods and services from the economic web model to identify new market niches.

BACKGROUND

Any economy comprises a relation among agents, goods and services. Each good and service in the economy, with the exception of the most primitive goods and services, consists of combinations of other goods and services. Goods and services can be complements or substitutes to other goods and services. Complements are sets of goods or services which are used jointly to produce other goods or services. For example, the screw and the screw driver are complementary goods. In contrast, substitutes are sets of goods or services which might substitute for one another in a given production technology or consumption good. For example, the screw and nail are substitute goods. Complementary goods and services must be used together to create value in the economy. See *The Origins of Order*, Kauffman, S., Oxford University Press (1993), Chapter 10, which is incorporated herein by reference.

Most goods and services create value in the economy via positive functional interactions with their complements and via competition with their substitutes. Further, most new goods and services enter the economy as complements or substitutes for existing goods and services. The goods and services in an economy themselves offer new opportunities to invent yet further goods and services. Thus, the economy transforms as new goods and services drive older goods and services out of the economy. See The Origins of Order, Chapter 10.

For example, the invention of the automobile led to the requirement for other goods and services ranging from paved roads, traffic lights, and traffic adjudication systems to oil refineries, gasoline stations, automobile repair facilities, parts manufacturers, and emission control devices. In contrast, the invention of the automobile led to elimination of the horse for most transport. In turn, the elimination of the horse led to the elimination of stables, public watering troughs, blacksmiths, the Pony Express, etc. See The Origins of Order, Chapter 10.

Accordingly, much of economic growth is driven by the persistent creation of novel economic opportunities in the interstices between existing goods and services, where new goods and services can enter the economy. The rate of formation of new economic niches is an increasing function of the total diversity of goods and services in the economy.

To succeed within the economy, companies and other economic agents need to know information about the economy to identify new economic niches, new growth opportunities and new locations of strategic competition. Specifically, companies and other economic agents need to know the relation among the agents, goods and services of the economy and their position within the economy. Similarly, economic agents must achieve reasonable concepts about how the relation among the agents, goods, and services of the economy and their position within the economy will change as new goods and services enter and old ones go extinct in small and large Shumpeterian gales of creative destruction.

A previous method has attempted to identify new economic niches by combining goods and services with generative tools and by selecting a subset of the resulting set of new goods and services with a utility function which measures economic value. See Origins of Order, Chapter 10. This method generates new goods and services by representing them with binary strings and by performing operations among the strings to create new strings.

However, none of the prior art methods constructs an economic web, generates new goods and services to analyze an economy, and identifies new market niches using the functional relations among the goods and services in the economy. Accordingly, there is a need for a method and system that effectively and rapidly gathers data on the functional relations within an economy and synthesizes an economic web model defining the local structure of the economic relations within the vicinity of a company or other economic agent. Further, there is a need for a method and system that can analyze the functional structure of the economic web model to identify new niches, new growth opportunities and new locations of strategic competition for a company or other economic agent.

SUMMARY OF THE INVENTION

The invention provides a system and method called Economic Web Sherpa which effectively and rapidly gathers data on the functional relations within an economy and which synthesizes an economic web model defining the local structure of the economic relations within the vicinity of a company or other economic agent. Economic Web Sherpa also analyzes the functional structure of the economic web model and synthesizes new goods and services to identify new niches, new growth opportunities and new locations of strategic competition for a company or other economic agent.

In particular, it is an aspect of the invention to present a system for providing economic guidance to economic agents acting within an economy of economic agents, goods and services comprising:

a plurality of economic objects characterizing the economic agents, the goods and the services in the economy;

a plurality of searching operations corresponding to the economic objects wherein the searching operations find relations with the economic agents, the goods and the services in the economy and construct a graph representation of the functional relations; and a plurality of analysis operations for determining features of the graph representation of the functional relations in the economy.

It is a further aspect of the invention to present a system for providing economic guidance to economic agents acting within an economy of economic agents, goods and services wherein the analysis operations comprise a plurality of generative operations corresponding to the economic objects for generating new goods and new services from the graph representation of the functional relations in the economy to identify new market niches.

It is a further aspect of the invention to present a system for providing economic guidance to economic agents acting within an economy of economic agents, goods and services wherein the economic objects further comprise a corresponding plurality of attributes and behavior, the attributes and the behavior characterizing functionalities of the economic agents, the goods and the services in the economy.

It is a further aspect of the invention to present a system for providing economic guidance to economic agents acting within an economy of economic agents, goods and services wherein the searching operations comprise:

a plurality of search complement operations for locating complementary objects of the economic objects having complementary ones of the attributes or the behavior; and a plurality of search substitute operations for locating substitute objects of the economic objects having substitute ones of the attributes or the behavior.

It is a further aspect of the invention to present a method for providing economic guidance to economic agents acting within an economy of economic agents, goods and services comprising the steps of:

characterizing the economic agents, the goods and the services in the economy with a plurality of economic objects;

finding relations with the economic agents, the goods and the services in the economy with a plurality of searching operations corresponding to the economic objects;

constructing a graph representation of the functional relations; and determining features of the graph representation of the relations in the economy with a plurality of analysis operations.

BRIEF DESCRIPTION OF THE DRAWINGS

These and other objects, features and advantages of the invention will be more readily apparent from the following detailed description in which.

DETAILED DESCRIPTION OF THE PREFERRED EMBODIMENT

Figure 1:
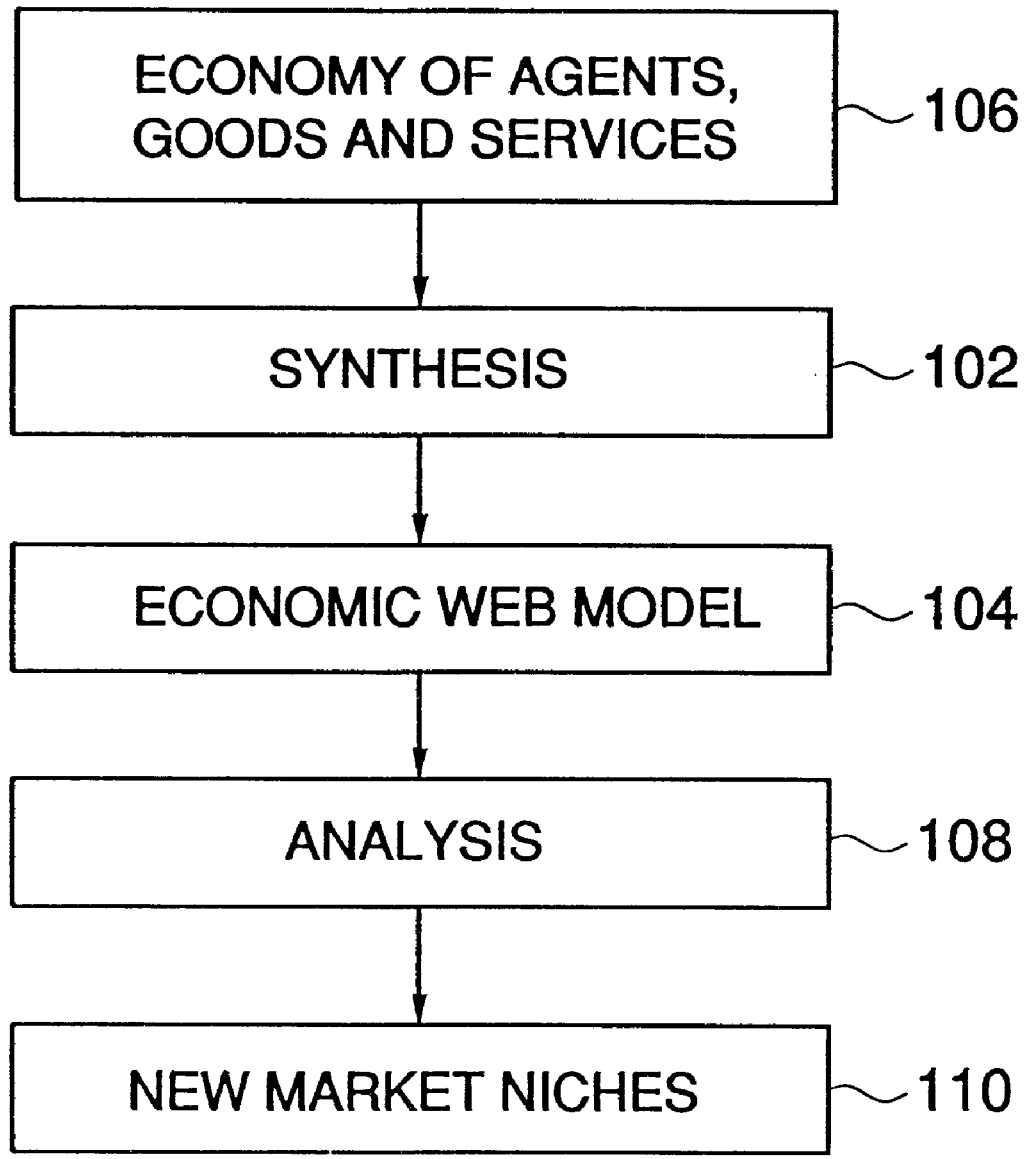
FIG. 1 provides a dataflow diagram representing an overview of the system and method for creating an economic web model of an economy of goods and services and synthesizing new goods and services from the economic web model to identify new market niches.

FIG. 1 provides a dataflow diagram 100 representing an overview of the system and method of the present invention for creating an economic web model of an economy of goods and services and synthesizing new goods and services from the economic web model to identify new market niches. This system and method is called Economic Web Sherpa. As is known to persons of ordinary skill in the art, a dataflow diagram is a graph whose nodes are processes and whose arcs are dataflows. See *Object Oriented Modeling and Design*, Rumbaugh, J., Prentice Hall, Inc. (1991), Chapter 1. In step 102, an economic web synthesis system creates an economic web model 104 of an economy from information 106 on the relation of agents, goods, and services within the economy. In step 108, an economic web analysis tool extracts useful economic information and synthesizes new goods and services 110 from the economic web model 104 to identify new market niches.

Without limitation, the following embodiments of the invention, Economic Web Sherpa, are described in the illustrative context of a solution using object oriented design and graph theory. However, it will be apparent to persons of ordinary skill in the art that other design techniques such as a structured procedural paradigm could be used to embody the aspect of the present invention which includes the gathering of data on the relations within an economy, the synthesis of an economic web model defining the local structure of the economic relations, the analysis of the structure of the economic web model and the generation of new goods and services to identify new market niches.

The economic web model 104 comprises a plurality of undirected graph representations of the relations of the agents, goods and services within the economy. As is known in the art, an undirected graph G[V, E, δ] consists of a set V of vertices, a set E of edges, and a function δ from the set E to the set of ordered pairs <u, v> for u a member of V and v a member of V. See *Introduction to Discrete Structures*, Preparata and Yeh, Addison-Wesley Publishing Company, Inc., (1973), pg. 67.

In one of the plurality of undirected graphs, G[V, E, δ] of the economic web model 104, each vertex v of the set of vertices V represents an object. More formally, there exists a one-to-one correspondence between the set of objects representing the goods and services in the economy and the set of vertices V in the undirected graph G[V, E, δ] model of the economic web 104. A function denoted by g: O–>V from the set of objects O representing the goods and services in the economy to the set of vertices V in the corresponding undirected graph G[V, E, δ] assigns the vertex v to an object o (g(o)=v). Preferably, a vertex v is created and assigned to an object o when the good or service corresponding to the object becomes conceivable in an economy.

As is known in the art, objects are distinguishable entities and have attributes and behavior. See *Object Oriented Modeling and Design*, Chapter 1. Further, objects having the same attributes and behavior are grouped into a class. In other words, objects are instances of classes. In the economic web model 104 of the present invention, each class represents a type of agent, good, or service in the economy.

As is known in the art, class generalization or inheritance is the sharing of attributes and operations among classes based on a hierarchical relationship. The classes of the economic web model 104 are defined broadly and then refined into successively finer subclasses. Each subclass incorporates, or inherits, all of the properties of its superclass and adds its own unique attributes or operations. Accordingly, the attributes and operations of a superclass need not be repeated in each subclass. See *Object Oriented Modeling and Design*, Chapter 1.

However, the present invention is not limited to any particular type of class generalization or inheritance. For example, the present invention also operates with classes of objects which do not share any single property. Instead, these classes merely represent a family resemblance. See *Philosophical Investigations*, Ludwig Wittgenstein, Macmillan, New York, (1968).

Figure 2:
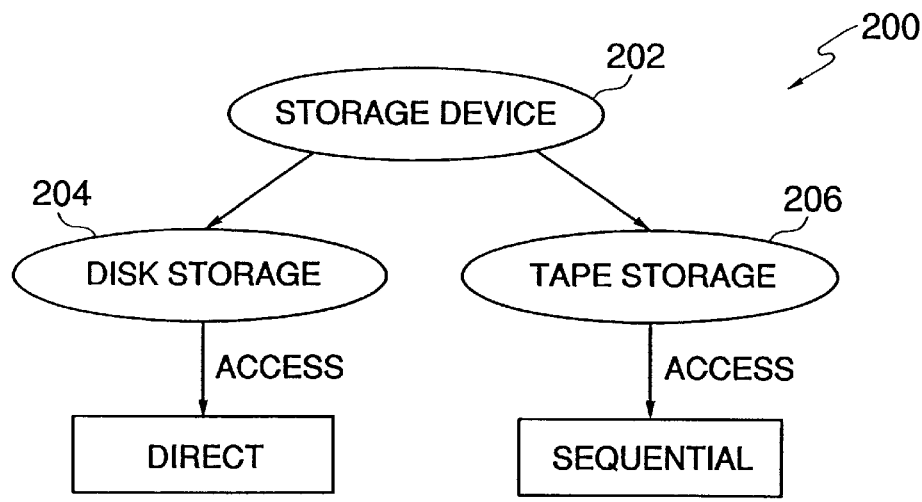
FIG. 2 shows an exemplary class generalization or inheritance.

FIG. 2 shows an exemplary class generalization or inheritance 200. In the hierarchical relationship, the StorageDevice class 202 is a superclass of the DiskStorage class 204 and the TapeStorage class 206. Similarly, both the DiskStorage class 204 and the TapeStorage class 206 are subclasses of the StorageDevice class 202. Because of the subclass relationship, both the DiskStorage class 204 and the TapeStorage class 206 will inherit the attributes and operations of the StorageDevice class 202. Further, the DiskStorage class 204 and the TapeStorage class 206 will also add their own unique attributes and operations.

As is known in the art, aggregation is a "part-whole" relationship among classes based on a hierarchical relationship in which classes representing components are associated with a class representing an entire assembly. See *Object Oriented Modeling and Design*, Chapter 3. The aggregation hierarchy of the economic web model 104 comprise assembly classes and component classes. An aggregation relationship relates an assembly class to one component class. Accordingly, an assembly class having many component classes has many aggregation relationships.

Figure 3A:
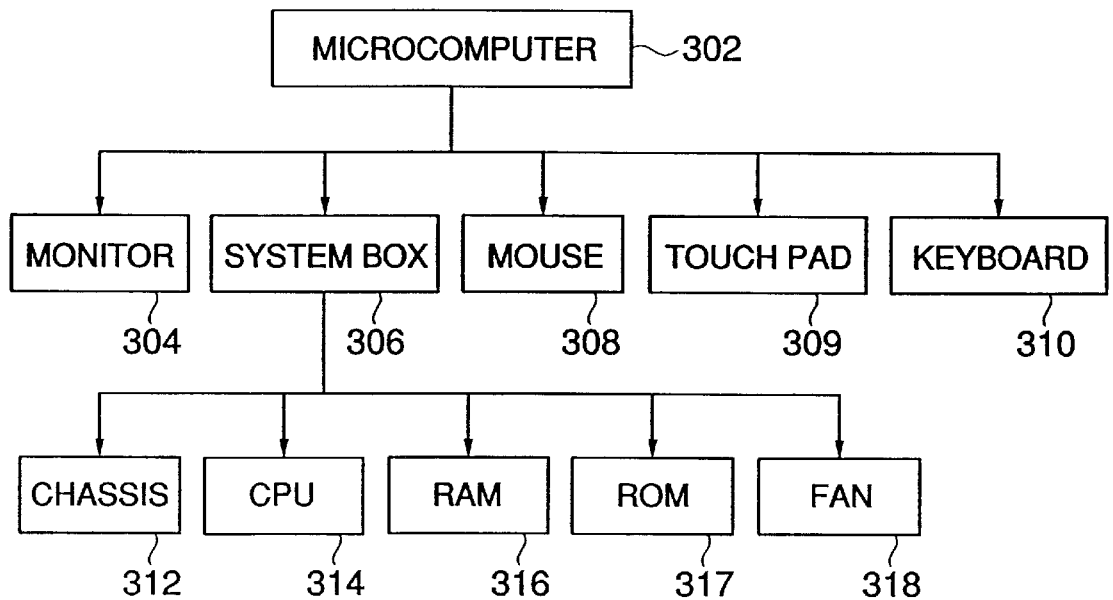
FIG. 3 shows an exemplary aggregation hierarchy comprising assembly classes and component classes.

FIG. 3a shows an exemplary aggregation hierarchy 300 comprising assembly classes and component classes. The system box 306 is an assembly class of the chassis component class 312, the CPU component class 314, the RAM component class 316, the ROM component class 317, and the fan component class 318. Similarly, the microcomputer class 302 is an assembly class of the monitor component class 304, the system box component class 306, the mouse component class 308, the touchpad component class 309 and the keyboard component class 310.

Figure 3B:
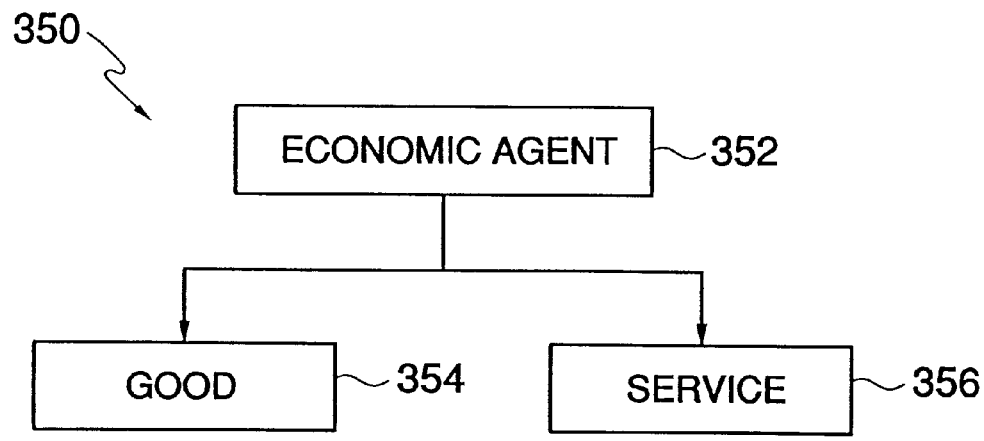

FIG. 3b shows an aggregation hierarchy 350 showing an aggregation relation among the goods, the services and the economic agents of an economy. The EconomicAgent class 352 is an assembly class of the Good component class 354 and the Service component class 356. Accordingly, this aggregation hierarchy 350 represents a "part-whole" relationship between an economic agent and the goods and services which it provides.

Exemplary attributes and behavior for the classes in the object model of the present invention include, "needs a", "is a", "performs a", "has a", etc. These attributes and behavior enable Economic Web Sherpa to find complement and substitute goods and services in the economy.

Figure 4A:
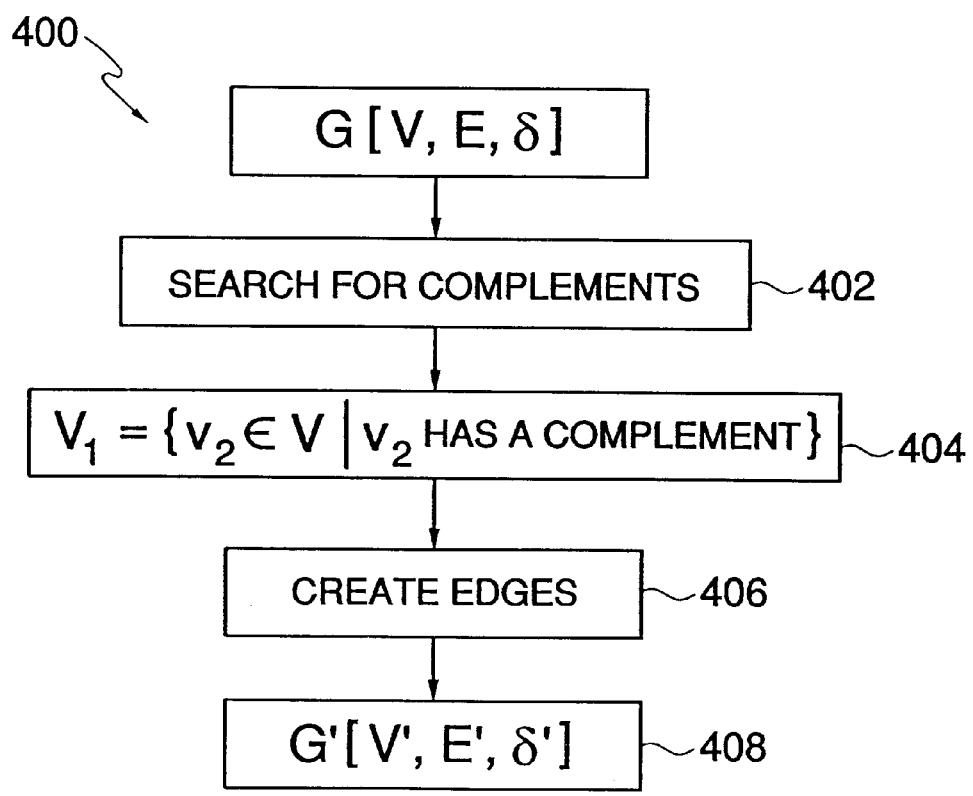
FIG. 4a provides the dataflow diagram corresponding to a SearchComplement operation for each object in the undirected graph G[V, E, δ] representation of the economic web model.

FIG. 4a provides the dataflow diagram corresponding to a SearchComplement operation 400 for each object (v1) in the undirected graph G[V, E, δ] representation of the economic web model 104. In step 402, the SearchComplement operation 400 searches for other objects represented by vertices from the set of vertices V in the undirected graph G[V, E, δ] having the attributes or operations which complement the searching object's (v1) selected attributes or operations. The SearchComplement operation 400 searches for an object (v2) having complementary attributes or complementary operations by traversing the generalization or inheritance hierarchy from the class corresponding to the object (v2). In the preferred embodiment, the SearchComplement operation 400 searches continuously for complement objects. However, as is known in the art, the SearchComplement operation 400 can search by executing a discrete number of times. Execution of step 402 yields at 404 a subset V1 of the set of vertices V: V1={v2 member of V|v2 has a complementary attribute or operation of v1}.

In step 406, for each object (v2) matching the search criteria, the SearchComplement operation 400 creates an edge connecting the vertices v1, v2 (<v1,v2>) which becomes a member of the set of edges E in the undirected graph G[V, E, δ]. The SearchComplement operation 400 also creates a complement edge label for each edge (<v1, v2>) created in step 406 to properly identify the relation between the vertices v1, v2. Execution of step 406 yields at 408 a modified undirected graph G[V, E, δ].

Accordingly, execution of the SearchComplement operation 400 for all objects representing the goods and services in the economy yields an undirected graph G[V, E, δ] representation of the economic web model 104 at each economic agent in the economy. Moreover, the SearchComplement operation 400 yields undirected graph G[V, E, δ] representations of the economic web model 104 which evolve as new goods and services enter the economy and existing goods and services expire from the economy. Further, as is known in the art, the SearchComplement operation 400 can continue to develop the undirected graph G[V, E, δ] representations of the economic web model 104 after the economy stops changing.

Figure 4B:
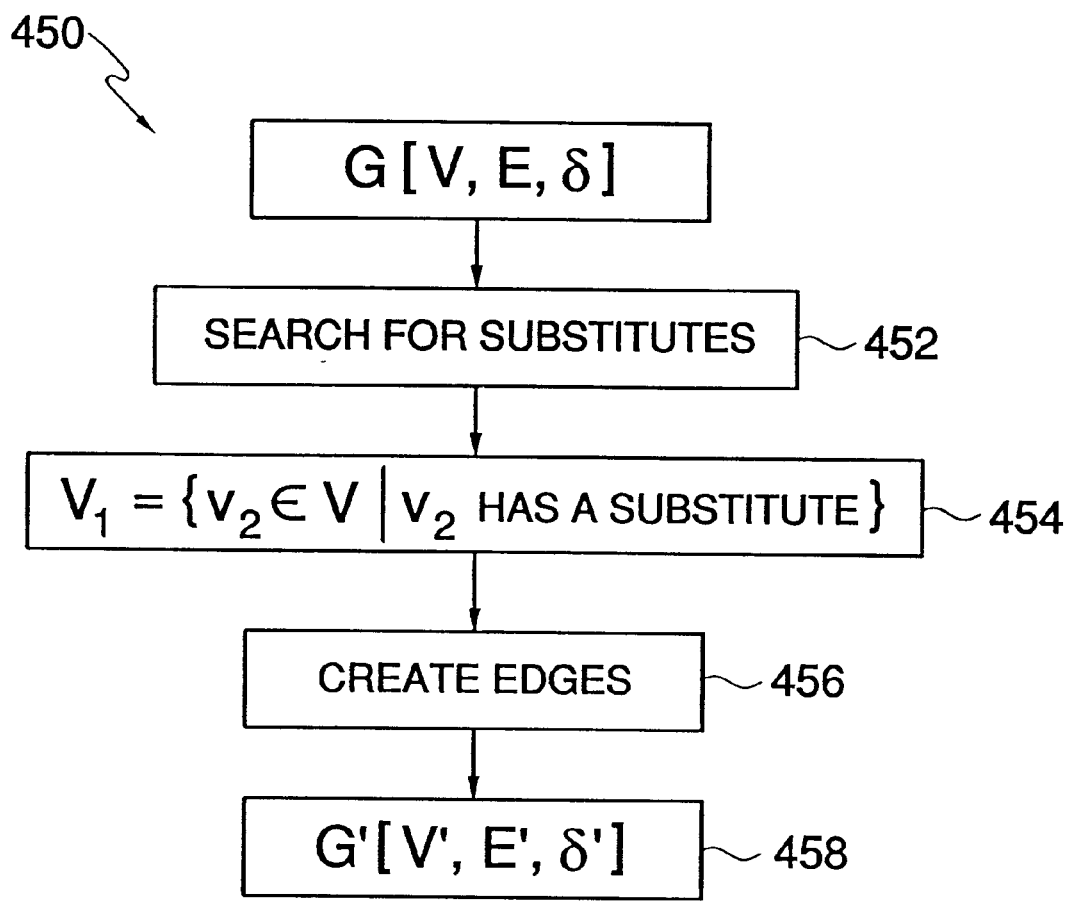
FIG. 4b provides the dataflow diagram corresponding to a SearchSubstitute operation for each object in the undirected graph G[V, E, δ] representation of the economic web model.

Similarly, FIG. 4b provides the dataflow diagram corresponding to a SearchSubstitute operation 450 for each object (v1) in the undirected graph G[V, E, δ] representation of the economic web model 104. In step 452, the SearchSubstitute operation 450 searches for other objects represented by vertices from the set of vertices V in the undirected graph G[V, E, δ] having the attributes or operations which can substitute for the searching object's (v1) selected attributes or operations. The SearchSubstitute operation 450 searches for an object (v2) having substitute attributes or substitute operations by traversing the generalization or inheritance hierarchy from the class corresponding to the object (v2). In the preferred embodiment, the SearchSubstitute operation 450 searches continuously for substitute objects. However, as is known to persons of ordinary skill in the art, the SearchSubstitute operation 450 can search by executing a discrete number of times. Execution of step 452 yields at 454 a subset V1 of the set of vertices V: V1={v2 member of V|v2 has a substitute attribute or operation of v1}.

In step 456, for each object (v2) matching the search criteria, the SearchSubstitute operation 450 creates an edge connecting the vertices v1, v2 (<v1,v2>) which becomes a member of the set of edges E in the undirected graph G[V, E, δ]. The SearchSubstitute operation 450 also creates a substitute edge label for each edge (<v1,v2>) created in step 456 to properly identify the relation between the vertices v1, v2. Execution of step 456 yields at 458 a modified undirected graph G[V, E, δ].

Accordingly, execution of the SearchSubstitute operation 450 for all objects representing the goods and services in the economy yields an evolving undirected graph G[V, E, δ] representation of the economic web model 104 at each economic agent in the economy. Moreover, the SearchSubstitute operation 450 yields undirected graph G[V, E, δ] representations of the economic web model 104 which evolve as new goods and services enter the economy and existing goods and services expire from the economy. Further, as is known in the art, the SearchSubstitute operation 400 can continue to develop the undirected graph G[V, E, δ] representations of the economic web model 104 after the economy stops changing.

Figure 5A:
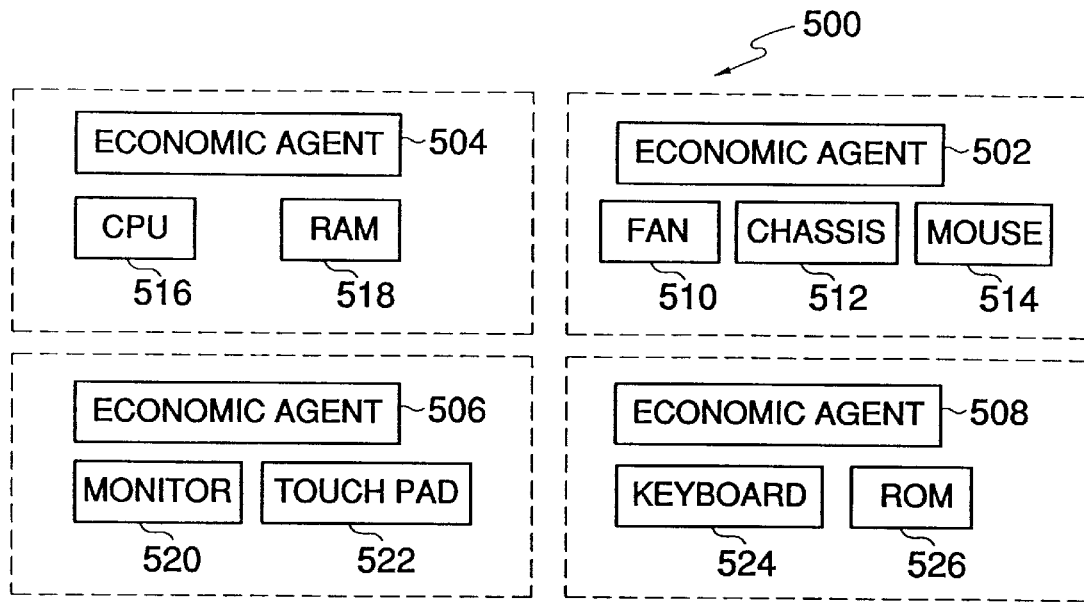
FIG. 5a shows an object model representing economic agents, goods and services in an economy.
Figure 5B:
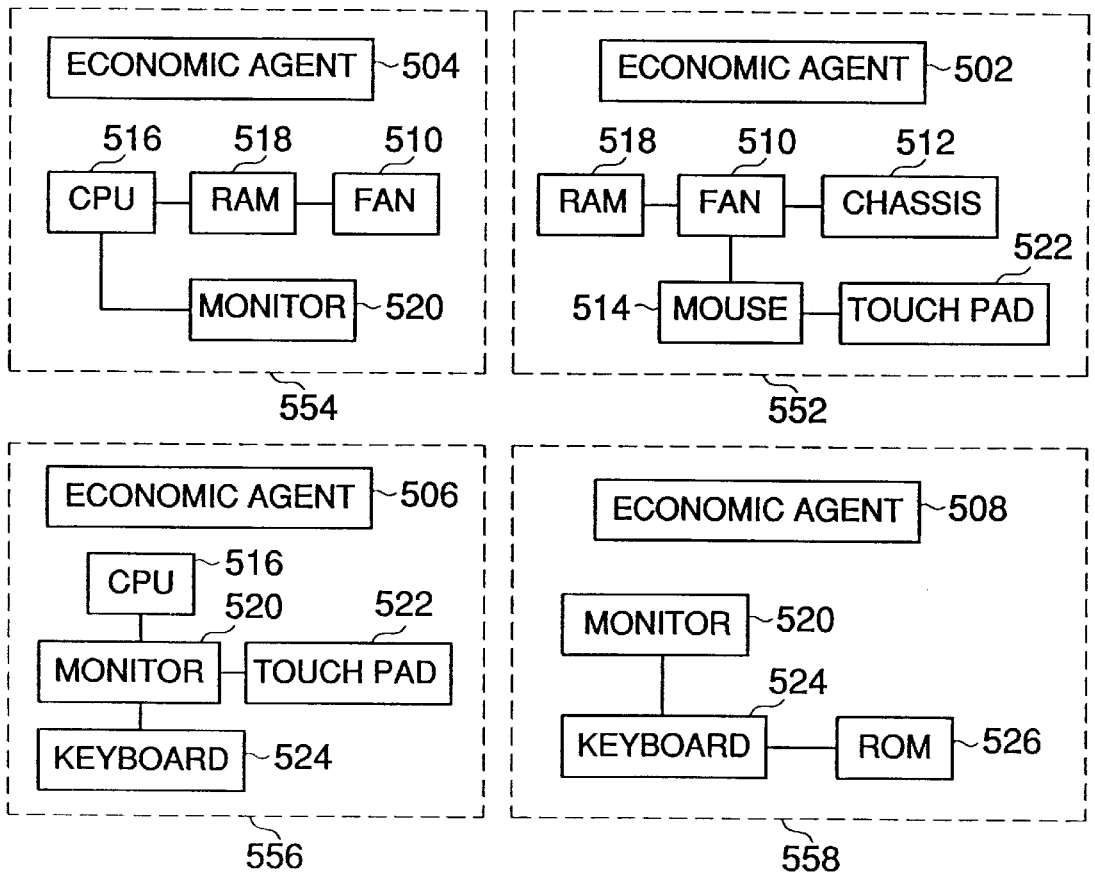
FIG. 5b shows the undirected graph representations G[V, E, δ] which result from execution of the SearchComplement and SearchSubstitute operations.

To illustrate the results of the SearchComplement operation 400 and the SearchSubstitute operation 450, FIG. 5a shows an object model 500 representing economic agents, goods and services in an economy and FIG. 5b shows the resulting undirected graph representations G[V, E, δ] 552, 554, 556, and 558. The EconomicAgent 502 assembly object comprises the fan component object 510, the chassis component object 512 and the mouse component object 514. Similarly, the EconomicAgent assembly object 504 comprises a CPU component object 516 and a RAM component object 518. The EconomicAgent assembly object 506 comprises a monitor component object 520 and a touchpad component object 522. The EconomicAgent assembly object 508 comprises a keyboard object 524 and a ROM object 526.

FIG. 5b shows the undirected graph representations G[V, E, δ] 552, 554, 556 and 558 at the economic agents 502, 504, 506, and 508 respectively resulting from execution of the SearchComplement operation 400 and the SearchSubstitute operations 450 for a period of time. For example, the undirected graph representation G[V, E, δ] 552 at the economic agent 502 shows complement relations between the RAM object 518 and the fan object 510, the fan object 510 and the chassis object 512, and the fan object 510 and the mouse object 514. Similarly, the undirected graph representation G[V, E, δ] 552 at the economic agent 502 shows a substitute relation between the mouse object 514 and the touchpad object 522. Next, the undirected graph representation G[V, E, δ] 554 at the economic agent 504 shows complement relations between the RAM object 518 and the fan object 510, the RAM object 518 and the CPU object 516, and the CPU object 516 and the monitor object 520.

Accordingly, each economic agent maintains a partial subgraph of the undirected graph representation G[V, E, δ] of the economic web model 104. As is known in the art, an undirected graph G'[V', E', δ'] is called a subgraph of an undirected graph G[V, E, δ] if V' is a subset of V and if E' (a subset of E) consists of all the edges in E joining vertices in V'. Further, δ' is a restriction of δ to the domain E'. G' is a partial subgraph of G if E' is a subset of all edges joining vertices in V'. See Introduction to Discrete Structures, Chapter 2.

In another of the plurality of undirected graphs, G'[V', E', δ'] of the economic web model 104, each vertex v' of the set of vertices V' represents an object of the EconomicAgent class 352. More formally, there exists a one-to-one correspondence between the set of objects O' representing the economic agents in the economy and the set of vertices V' in the undirected graph G'[V', E', δ'] model of the economic web 104. A function denoted by g': O'->V' from the set of objects O' representing the economic agents in the economy to the set of vertices V' in the corresponding undirected graph G'[V', E', δ'] assigns the vertex v' to an object o' (g'(o')=v').

Figure 6A:
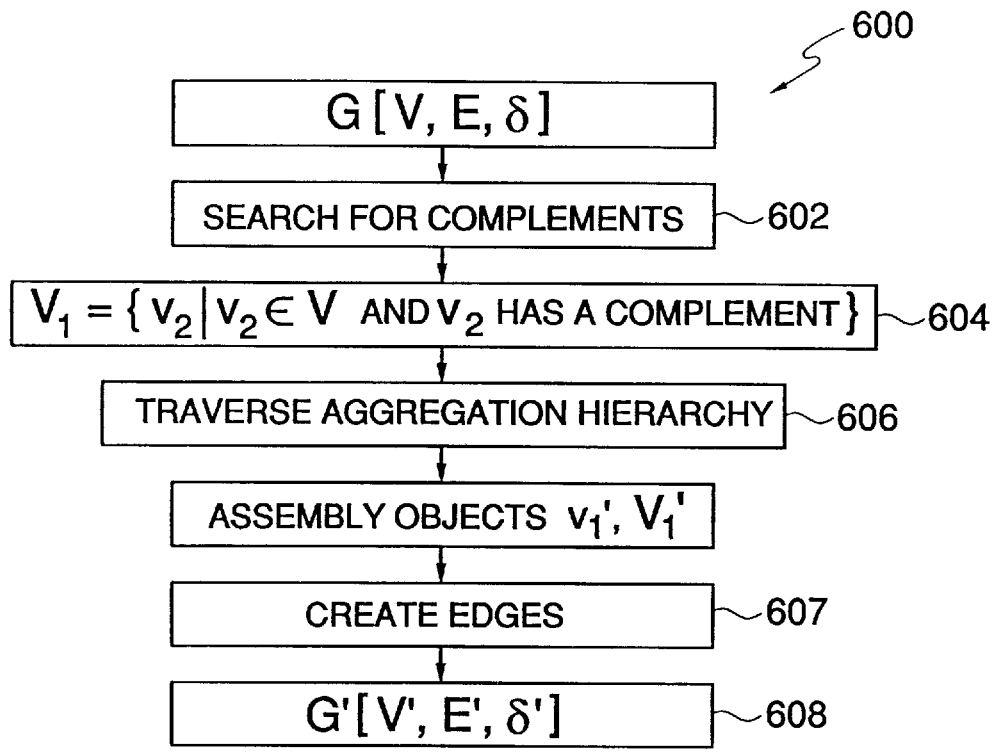
FIG. 6 provides the dataflow diagram corresponding to another SearchComplement operation for each object in the undirected graph G [V, E, δ] representation of the economic web model.

FIG. 6a provides the dataflow diagram corresponding to another SearchComplement operation 600 for each object (v1) in the undirected graph G [V, E, δ] representation of the economic web model 104. Step 602 operates like step 402 of the SearchComplement operation 400. Specifically, in step 602, the SearchComplement operation 600 searches for other objects represented by vertices from the set of vertices V in the undirected graph G[V, E, δ] for attributes or operations which can complement the searching object's (v1) selected attributes or operations. The SearchComplement operation 600 searches for an object (v2) having complement attributes or operations by traversing the generalization or inheritance hierarchy from the class corresponding to the object (v2). In the preferred embodiment, the SearchComplement operation 600 searches continuously for complementary objects.

However, as is known to persons of ordinary skill in the art, the SearchComplement operation 600 can search by executing a discrete number of times. Execution of step 602 yields at 604 a subset V of the set of vertices V: V1={v2 member of V|v2 has a complement attribute or operation of v1}.

However, unlike step 406 in the SearchComplement operation 400, in step 606 the SearchComplement operation 600 traverses the aggregation hierarchy 350 to find the assembly object v1' representing an economic agent corresponding to the component object v1. Likewise, for each object (v2) matching the search criteria, in step 606 the SearchComplement operator 600 traverses the aggregation hierarchy 350 to find the assembly object v2' representing an economic agent corresponding to the component object v2. In step 607, the assembly object v1 creates an edge connecting the vertices v1', v2' (<v1',v2'>) which becomes a member of the set of edges E' in the undirected graph G'[V', E', δ']. The SearchComplement operation 600 also creates a complement edge label for each edge (<v1',v2'>) created in step 607 to properly identify the relation between the vertices v1', v2'. Execution of step 606 and step 607 yields at 608 a modified undirected graph G'[V', E', δ'].

Accordingly, execution of the SearchComplement operation 600 for all objects representing the goods and services in the economy yields an evolving undirected graph G'[V', E', δ'] representation of the economic web model 104 at each economic agent in the economy. Moreover, the SearchComplement operation 600 yields undirected graph G'[V', E', δ'] representations of the economic web model 104 which evolve as new goods and services enter the economy and existing goods and services expire from the economy. Further, as is known to persons of ordinary skill in the art, the SearchComplement operation 600 can continue to develop the undirected graph G'[V', E', δ'] representations of the economic web model 104 after the economy stops changing.

Figure 6B:
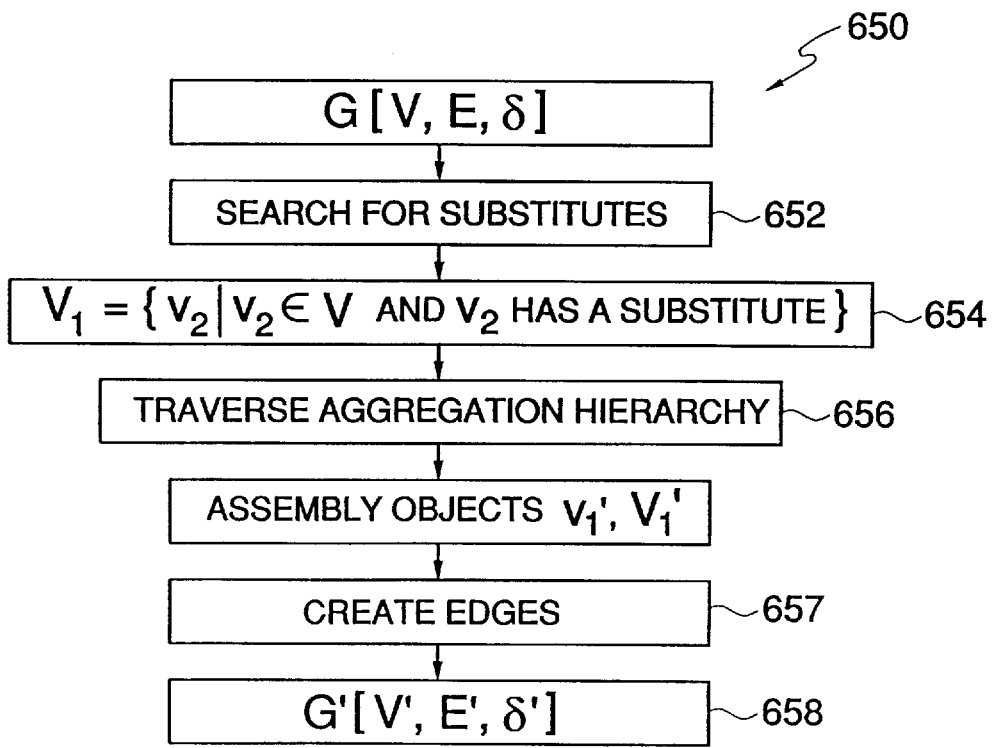

FIG. 6b provides the dataflow diagram corresponding to another SearchSubstitute operation 650 for each object (v1) in the undirected graph G [V, E, δ] representation of the economic web model 104. Step 652 operates like step 452 of the SearchSubstitute operation 450. Specifically, in step 652, the SearchSubstitute operation 650 searches for other objects represented by vertices from the set of vertices V in the undirected graph G[V, E, δ] for attributes or operations which can substitute for the searching object's (v1) selected attributes or operations. The SearchSubstitute operation 650 searches for an object (v2) having substitute attributes or operations by traversing the generalization or inheritance hierarchy from the class corresponding to the object (v2). In the preferred embodiment, the SearchSubstitute operation 650 searches continuously for substitute objects. However, as is known to persons of ordinary skill in the art, the SearchSubstitute operation 650 can search by executing a discrete number of times. Execution of step 652 yields at 654 a subset V1 of the set of vertices V: V1={v2 member of V|v2 has a substitute attribute or operation of v1}.

Unlike step 456 in the SearchSubstitute operation 450 however, in step 656, the SearchSubstitute operation 650 traverses the aggregation hierarchy to find the assembly object v1' representing an economic agent corresponding to the component object v1. Likewise, also in step 656, for each object (v2) matching the search criteria, the SearchSubstitute operator 650 traverses the aggregation hierarchy to find the assembly object v2' representing an economic agent corresponding to the component object v2. In step 657, the assembly object v1 creates an edge connecting the vertices v1', v2' (<v1',v2'>) which becomes a member of the set of edges E' in the undirected graph G'[V', E', δ']. The SearchSubstitute operation 650 also creates a substitute edge label for each edge (<v1',v2'>) created in step 657 to properly identify the relation between the vertices v1', v2'. Execution of step 706 and step 707 yields at 708 a modified undirected graph G'[V', E', δ'].

Accordingly, execution of the SearchSubstitute operation 650 for all objects representing the goods and services in the economy yields an evolving undirected graph G'[V', E', δ'] representation of the economic web model 104 at each economic agent in the economy. Moreover, the SearchSubstitute operation 650 yields undirected graph G'[V', E', δ'] representations of the economic web model 104 which evolve as new goods and services enter the economy and existing goods and services expire from the economy. Further, as is known to persons of ordinary skill in the art, the SearchSubstitute operation 650 can continue to develop the undirected graph G'[V', E', δ'] representations of the economic web model 104 after the economy stops changing.

Figure 7:
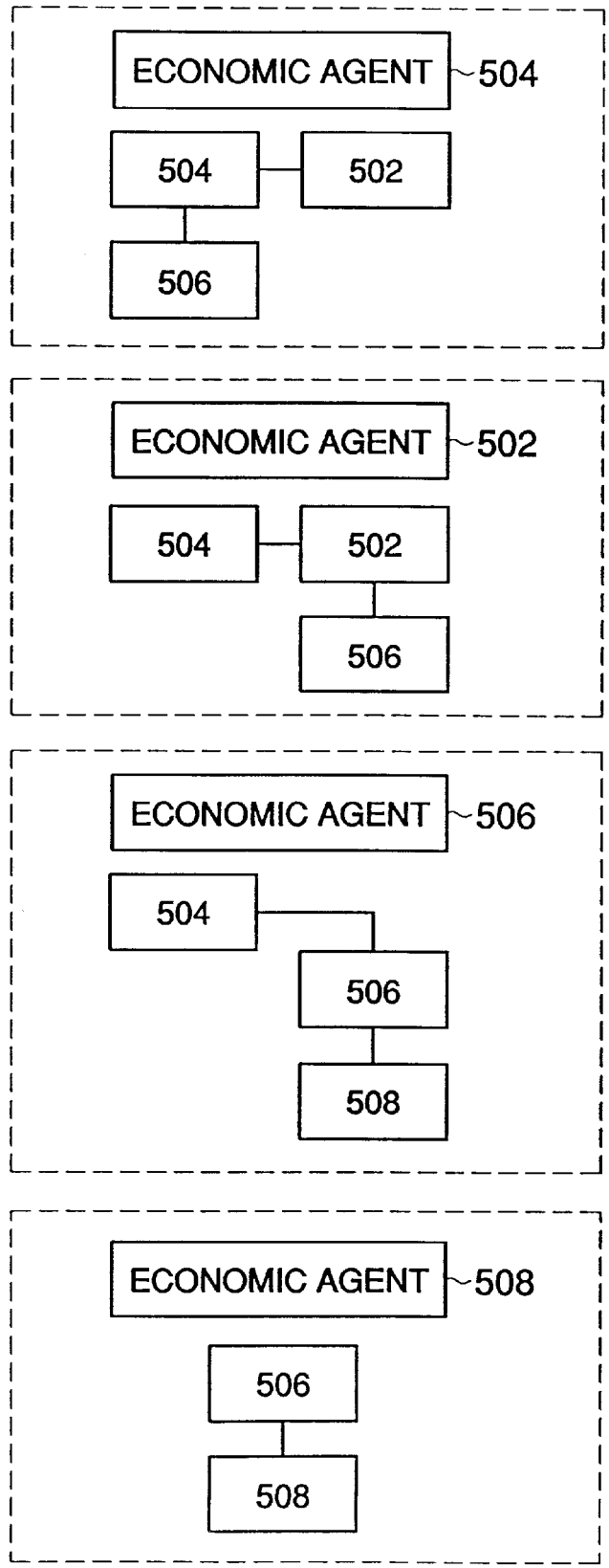
FIG. 7 shows the undirected graph representations G[V, E, δ] at the economic agents resulting from execution of the SearchComplement operation and the SearchSubstitute operations for a period of time.

FIG. 7 shows the undirected graph representations G[V, E, δ] at the economic agents 502, 504, 506, and 508 respectively resulting from execution of the SearchComplement operation 600 and the SearchSubstitute operations 650 for a period of time. For example, the undirected graph representation G[V, E, δ] at EconomicAgent 502 shows that EconomicAgent 502 has a relation with EconomicAgent 504 and EconomicAgent 506. Specifically, the EconomicAgent 502 assembly object has component objects which have either a complement relation or a substitute relation with a component object of assembly object EconomicAgent 504 and with a component object of assembly object EconomicAgent 506.

Similarly, the undirected graph representation G[V, E, δ] at EconomicAgent 504 shows that EconomicAgent 504 has a relation with EconomicAgent 502 and EconomicAgent 506. The undirected graph representation G[V, E, δ] at EconomicAgent 506 shows that EconomicAgent 506 has a relation with EconomicAgent 504 and EconomicAgent 508. Finally, the undirected graph representation G[V, E, δ] at EconomicAgent 508 shows that EconomicAgent 508 has a relation with EconomicAgent 506. Accordingly, each economic agent maintains a partial subgraph of an undirected graph representation G[V, E, δ] of an economic web model 104 which shows all the relations among the economic agents. See *Introduction to Discrete Structures*, Chapter 2.

Figure 8:
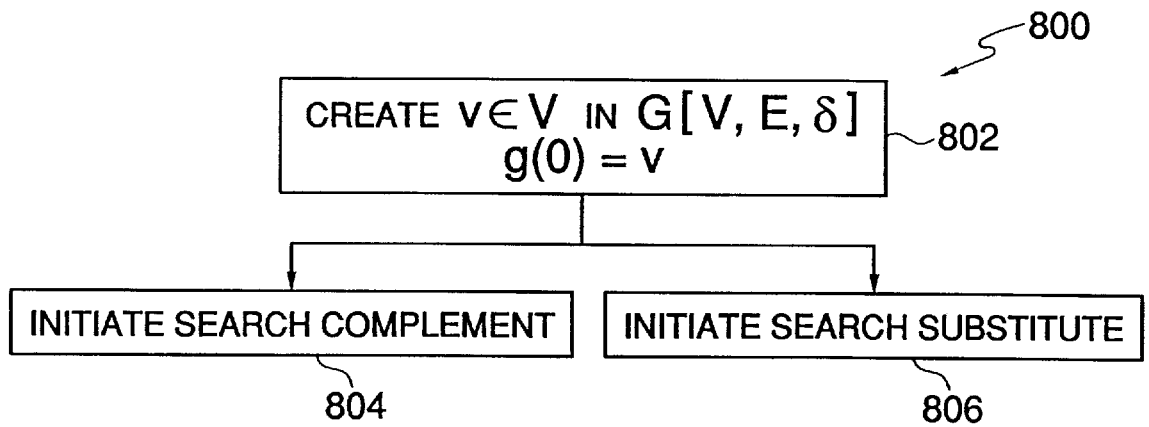
FIG. 8 provides the dataflow diagram corresponding to the object construction operator.

FIG. 8 provides the dataflow diagram corresponding to the object construction operator 800. When an economic agent, good or service becomes part of an economy, the object construction operator 800 creates a vertex v in the undirected graph G[V, E, δ] representation of the economic web model 104 in step 802 for an object o corresponding to the agent, good or service. In step 804, the object construction operator 800 assigns the vertex v to the object o (g(o)=v). In step 806, the object construction operator 800 initiates the SearchComplement operators 400 (FIG. 4), 600 (FIG. 6) and the SearchSubstitute operators 450 (FIG. 4b), 700 (FIG. 7).

In the preferred embodiment, the object construction operator 800 is a constructor. As is known in the art, a constructor for an object executes when the object is instantiated. See *C++ Primer*, Stanley B. Lippman, Addison-Wesley Publishing Company, 2nd edition, (1991), Section 1.8.

Figure 9:
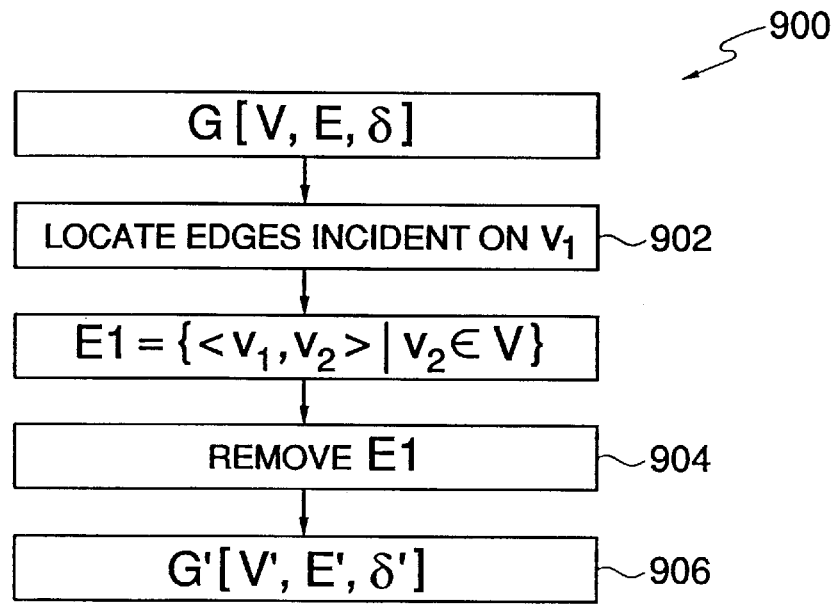
FIG. 9 provides the dataflow diagram corresponding to the object destruction operator.

FIG. 9 provides the dataflow diagram corresponding to the object destruction operator 900. When an agent, good, or service is removed from an economy, the object destruction operator 900 locates the subset of edges E1 of the set of edge E connecting the vertex v1 corresponding to the object o (g(o)=v1) to a vertex v2 of the set of vertices V of the undirected graph G[V, E, δ]: E1={<v1, v2>|v2 is a member of the set of vertices V} in step 902. In step 904, the object destruction operator 900 removes the subset of edges E1 including the edge labels from the undirected graph G[V, E, δ]. Execution of step 904 yields a modified undirected graph G[V, E, δ] 906. Accordingly, execution of the object destruction operator 900 for all objects representing the agents, goods, or services which are removed from the economy yields an evolving undirected graph G[V, E, δ] representation of the economic web model 104. In the preferred embodiment, the object destructor operator 900 is a destructor. As is known in the art, a destructor for an object executes when the object is removed.

See *C++ Primer*, Section 1.8.

Figure 10:
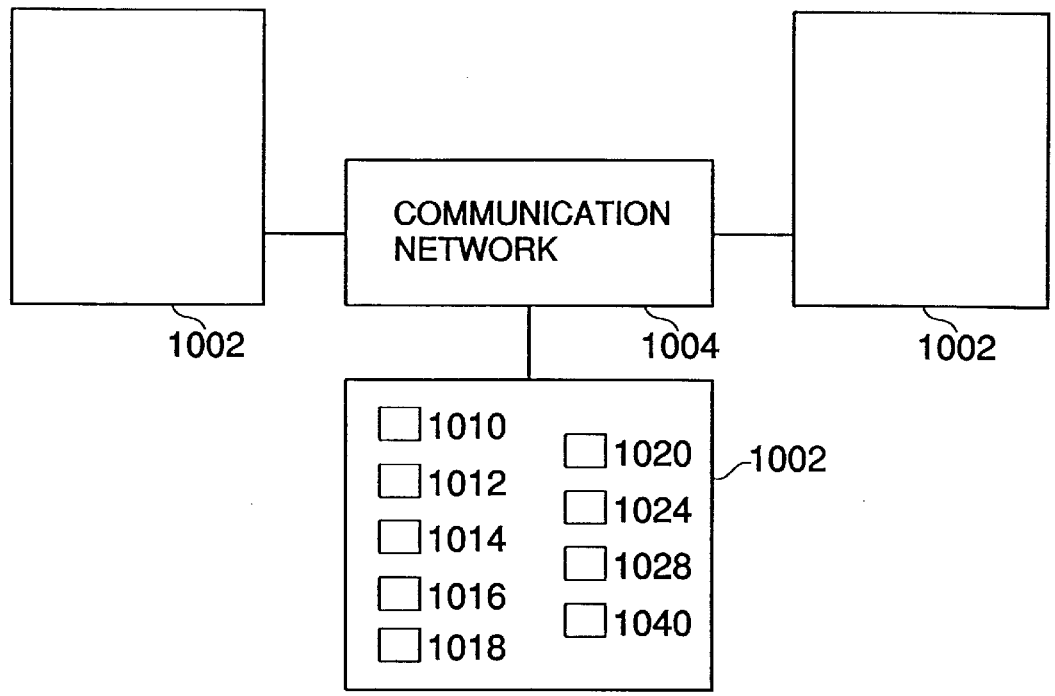
FIG. 10 shows an exemplary database system to store the undirected graph G [V, E, δ] representations of the economic web model and the objects corresponding to the agents, goods and services in an economy.

In the preferred embodiment, a distributed database system 1000 as shown in FIG. 10, stores the undirected graph G [V, E, δ] representations of the economic web model 104 and the objects corresponding to the agents, goods and services in an economy. As is known to persons of ordinary skill in the art, a distributed database system 1000 consists of a collection of sites 1002, each of which maintains a local database system and each of which may participate in the execution of transactions which access data at one site, or several sites through a communication network 1004. Further, a database is a collection of data. See *Database System Concepts*, Henry F. Korth and Abraham Silberschatz, McGraw-Hill Book Company, (1986), Chapters 1 and 12.

In the preferred embodiment each site 1002 represents an economic agent. Accordingly, each site 1002 maintains a local database wherein the collection of data comprises the objects representing the goods and services associated with the economic agent represented by the site 1002. The collection of data further comprises the economic agent's local view of the undirected graph G [V, E, δ] representations of the economic web model 104.

However, the present invention is not restricted to a distributed database. For example, in an alternate embodiment, a central database system stores the undirected graph G [V, E, δ] representations of the economic web model 104 and the objects corresponding to the agents, goods and services in an economy. Exemplary databases include: Microsoft SQL Server, Microsoft Access 1.0, 2.0 and 7.0, Microsoft FoxPro 2.0, 2.5 and 2.6, Oracle 7.0, Borland Paradox 3.X and 4.X, Borland dBase III and dBase IV, and Microsoft Excel 3.0, 4.0 and 5.0.

In the preferred embodiment, the local databases at the sites 1002 representing economic agents are relational databases. As is known in the art, a relational database consists of a collection of tables, each of which is assigned a unique name. Further, a row in a table represents a relationship among a set of values. See *Database System Concepts*, Chapter 3.

FIG. 10 shows the major operational elements of the distributed database system 1000. The extraction utility 1012 transfers the data from the database 1010 to a bulk insert file (bif) 1014. A style file 1016 defines the format of the bif 1014. An indexing utility 1018 transforms the data from the bif 1014 to an indexed collection 1020 which can be accessed by a search engine 1028. Preferably, the search engine 1028 is Verity available from Verity, Inc. as described in, "Introduction to Verity Search Technology", http://www.verity.com/support/, the contents of which are herein incorporated by reference. Preferably, the indexing utility 1018 for use with Verity is mkvdk.

A query filter 1040 processes the query language statements of the SearchComplement steps 402 (FIG. 4), 602 (FIG. 6) and the SearchSubstitute steps 452 (FIG. 4b), 652 (FIG. 7). In the preferred embodiment, the query language statements are Verity query language statements. See "Introduction to Verity Search Technology". Preferably, the query filter 1040 is the Verity Server Component called Query Filter.

The search engine 1028 searches the indexed collection 1020 in accordance with the queries from the query filter 1040. Before performing the search, the search engine 1028 optimizes the queries as specified in *Database System Concepts*, Chapter 9, the contents of which are herein incorporated by reference. Preferably, the search engine 128 is the Verity Search '97 Information Server. In the preferred embodiment, the communication network 1004 of the distributed database system 1002 is the World Wide Web and each of the sites 1002 in the distributed database system 1000 is a Website.

Figure 11:
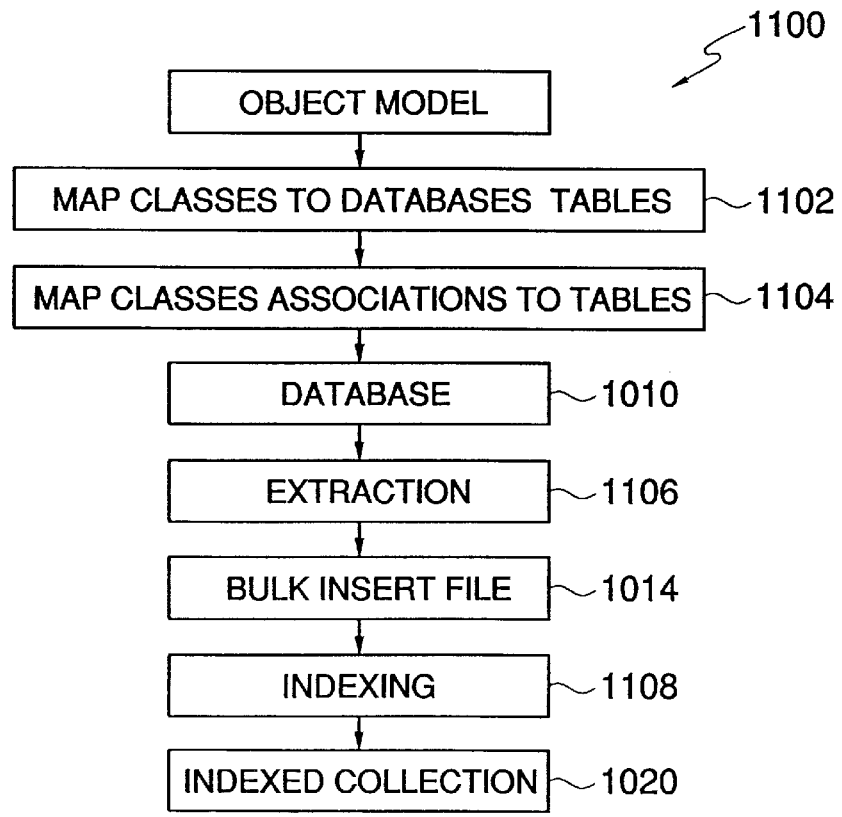
FIG. 11 is a dataflow diagram illustrating the procedure for translating the object model representation of the economic web model 104 to the tables in the relational database and for processing the database tables of the distributed database system.

FIG. 11 is a dataflow diagram illustrating the procedure 1100 for translating the object model representation of the economic web model 104 to the tables in the relational database and for processing the database tables of the distributed database system 1002. In step 1102, the translation procedure 1100 maps the classes representing the agents, goods and services in the economy to tables in the relational database. Specifically, each class corresponds to one or more tables. Further, each attribute of the class corresponds to a column in the table. Similarly, each instance of the class corresponds to a row in the table.

In step 1104, the translation procedure 1100 maps the associations among the classes to tables in the relational database. These associations include the complement and substitute associations as well as the associations of the generalization and inheritance hierarchy and the aggregation hierarchy.

As is known in the art, the primary keys for both related classes and any link attributes become attributes of the association table. See *Object Oriented Modeling and Design*, Chapter 17. A primary key denotes the minimal set of one or more attributes chosen by a database designer, which, taken collectively, uniquely identify a row in a table. See *Database System Concepts*, Chapter 1.

In step 1106, the extraction utility 1012 assembles the data from the database 1010 into the bulk insert file 1014 in accordance with the format defined by the style file 1016. Next, in step 1108, the indexing utility 1018, using the style file 1016, transforms the data from the bif 1014 to an indexed collection 1020 which can be accessed by the search engine 1028.

Figure 12:
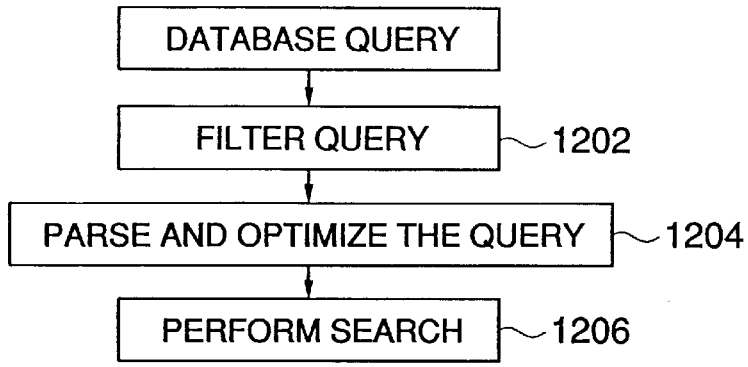
FIG. 12 is a dataflow diagram illustrating the implementation of the SearchComplement operation and the SearchSubstitute operation on the indexed collections containing the objects representing the goods and services in the economy.

FIG. 12 is a dataflow diagram illustrating the implementation of the SearchComplement steps 402 (FIG. 4), 602 (FIG. 6) and the SearchSubstitute steps 452 (FIG. 4b), 702 (FIG. 7) on the indexed collections 1020 containing the objects representing the goods and services in the economy. In step 1202, the query filter 1040 processes the query language statements of the SearchComplement steps 402 (FIG. 4), 602 (FIG. 6) and the SearchSubstitute steps 452 (FIG. 4b), 702 (FIG. 7). Next, in step 1204, a search engine 1028 parses and optimizes the queries. See *Database System Concepts*, Chapter 9. In step 1206, the search engine 1028 searches the indexed collection 1020 for complement and substitute objects.

In the preferred embodiment, the query language statements of the SearchComplement steps 402 (FIG. 4), 602 (FIG. 6) and the SearchSubstitute steps 452 (FIG. 4b), 702 (FIG. 7) are assembled into a stored procedure at each site 1002 and executed on other site 1002 (FIG. 10) to improve the performance of the SearchComplement operations 400, 600 and the SearchSubstitute operations 450, 650. As is known to persons of ordinary skill in the art, a stored procedure is a collection of query language statements which are pre-compiled and stored on a database server. See *MCSE Training Guide, SQL Server™ 6.5 Design & Implementation*, Sean Baird et al., New Riders Publishing, (1997) ("SQL Server™"), Chapter 10.

A database management system (DBMS) implements the object destructor operator 900 (FIG. 9) on the indexed collections 1020 containing the objects representing the goods and services in the economy. In other words, the DBMS enforces the referential integrity required to support the destructor operation 900. As is known in the art, a DBMS consists of a database and a collection of programs to access the database. See *Database System Concepts*, Chapter 1. Referential Integrity refers to ensuring that a row referenced in one table actually exists in another table. See *SQL Server™*, Chapter 10.

In the preferred embodiment, the DBMS uses nested triggers to cascade deletes for an object corresponding to an agent, good, or service which is removed from the economy. See *SQL Server*, Chapter 10. Specifically, when an object is deleted, a delete trigger on the class table removes the row corresponding to the object. In addition, the delete trigger performs a delete on the tables corresponding to the object's complement and substitute associations. Next, the delete trigger on the association tables remove the deleted object's complement and substitute associations.

In the preferred embodiment, the Economic Web Sherpa system 100 is implemented with distributed applications called applets. As is known to persons of ordinary skill in the art, applets are loaded and executed dynamically upon selection of a web page to which they are linked. Applets are written in a computer language that is specifically designed for creating distributed programs. See *The Internet, Complete Reference*, Harley Hahn, McGraw Hill, 1996, Chapter 10. In the preferred embodiment, the Economic Web Sherpa 100 uses Java as the computer language for implementing the distributed programs.

The assembly of the partial subgraphs maintained at each economic agent 502, 504, 506, 508, etc. as shown in FIG. 5b at their corresponding sites 1002 yields an undirected graph representation G[V, E, δ] of the complete economic web model 104 of the economy of goods, services and economic agents.

The present invention, Economic Web Sherpa operates in a plurality of different modes corresponding to a plurality of different levels of abstraction. In the most abstract mode, Economic Web Sherpa constructs an economic web model 104 from observations of relations between goods and services in the economy. The undirected graph representation G[V, E, δ] of the most abstract mode contains an edge between two vertices if a complement or substitute relation was observed between two corresponding goods and services. Accordingly, in its most abstract mode, Economic Web Sherpa does not represent any functional attributes or behavior of the objects of the economic web model 104. In successively less abstract modes, the objects of the economic web model 104 contain successively more detailed functional attributes and behavior of the goods and services in the economy.

After construction of the economic web model 104, the present invention performs an analysis of the economic web model 104 at any moment in time to reveal important features of the economy (Step 108, FIG. 1). Like the undirected graph representation G[V, E, δ] of the economic web model 104, the analysis aspect of Economic Web Sherpa operates in different levels of abstraction. In the most abstract mode, the analysis aspect only considers structural features of the undirected graph representation G[V, E, δ]. For example, as is known in the art and as explained in *Physical Design Automation of VLSI Systems*, The Benjamin/Cummings Publishing Company, Inc. (1988), Chapters 1 and 2, the contents of which are herein incorporated by reference, partitioning and clustering algorithms can identify central locations of activity within the economic web model 104. Likewise, additional analysis tools reveal other features such as the complementary and substitution connectivity among the sites 1002 and the diameter, radius, centroids, descendant trees, cliques, and cycle structure of the economic web model 104.

The structure of the economic web model 104 and the analysis reveal important economic data. For example, it is almost certainly more valuable to be at a center of a cluster in the economic web model 104, like the automobile and the computer, than on its periphery, like the hula hoop or the pet rock.

Further, major new goods create a burst of innovation of other new goods in their vicinity in the web. Testing for the location and local structure of the web of such new activities is of high economic value, both for capitalization choices and for marketing purposes.

Figure 13:
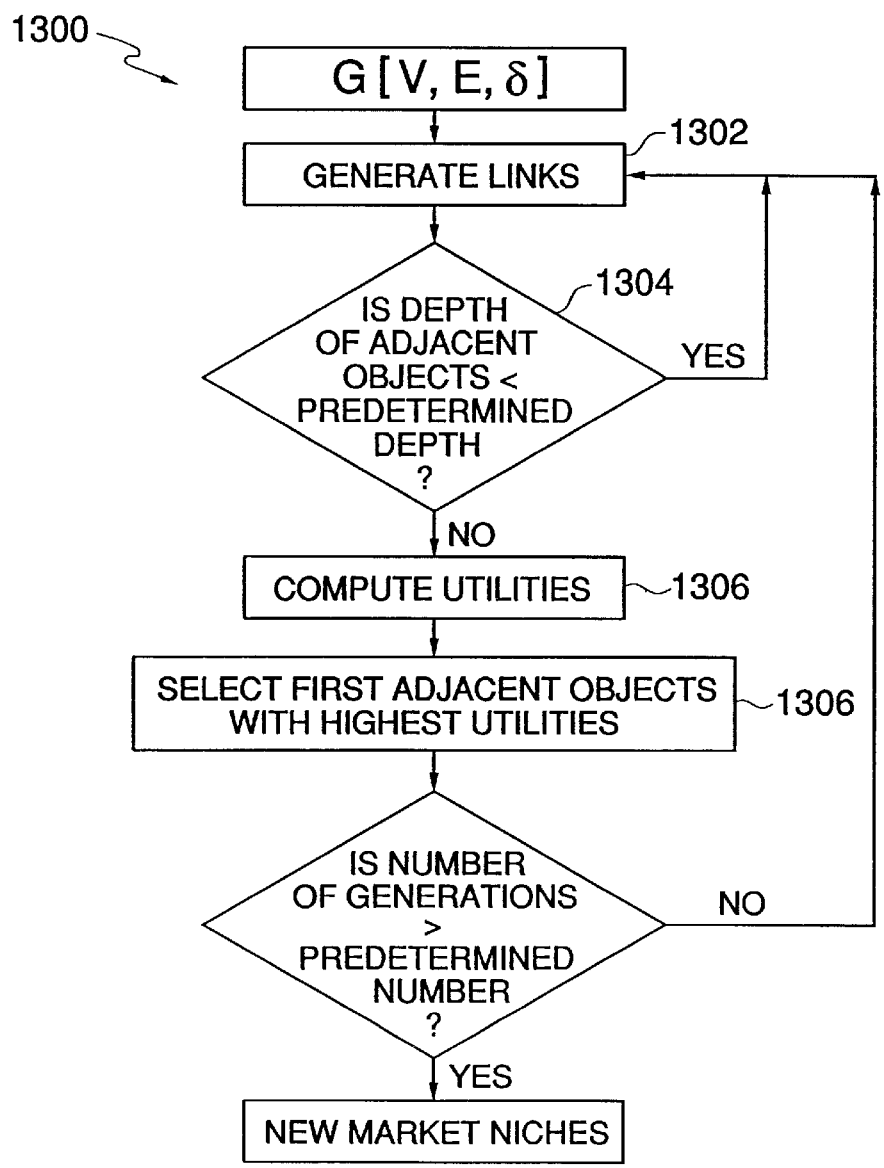
FIG. 13 is a dataflow diagram illustrating a generative operation to identify new niches, new growth opportunities and new locations of strategic competition for an economic agent by combining goods and services with generative tools and by selecting a subset of the resulting set of new goods and services with a utility function which measures economic value.

In successively less abstract modes, Economic Web Sherpa considers successively more detailed functional aspects and behavior of the objects representing the goods and services in the economy. For example, FIG. 13 is a dataflow diagram illustrating a generative operation 1300 to identify new niches, new growth opportunities and new locations of strategic competition for an economic agent by combining goods and services with generative tools which recognize functional relations between objects representing the goods and services. In less abstract embodiments, the generative operation 1300 also has a economic utility which selects a subset of the resulting set of new goods and services by measuring and considering economic value.

In step 1302, a generative operation 1300 automatically links pairs of objects, triplets of objects or higher order sets of objects which are functionally linkable to form a set of first adjacent objects representing a new set of adjacent possible goods and services. The generative operation 1300 uses the identified relations in the undirected graph representations G[V, B, δ] at the economic agents 502, 504, 506, and 508 (FIG. 7) to guide the search for functionally linkable objects.

In step 1304, the generative operation 1300 determines whether it has generated adjacent objects to the predetermined depth. If the generative operation 1300 has not generated adjacent objects to the predetermined depth, control proceeds to step 1302. In the second iteration of the loop, the generative operation 1300 automatically links objects from the set of extant objects and the set of first adjacent objects to form a set of second adjacent objects. By induction, the generative operation 1300 produces a set of incrementally higher adjacent objects at each successive iteration of the loop from the previously generated sets of adjacent objects and the original set of objects from the economic web model 104.

If the generative operation 1300 has generated adjacent objects to the predetermined depth, control exits the loop and proceeds to step 1306. In step 1306, an optional utility function, available in less abstract modes of Economic Web Sherpa, computes a value of each adjacent object as specified in *The Origins of Order*, Chapter 10. Specifically, the utility function computes the economic value of each adjacent object. The utility function also discounts the economic value of higher order adjacent objects to present value. For instance, if the economic value of a router today is 100 utils, the same router tomorrow is worth B*100 utils where B<1.0.

In step 1308, an optional selection utility, which is also available in less abstract modes of Economic Web Sherpa, chooses a predetermined number of the first adjacent objects with the highest economic utility. The optional selection utility further comprises a stochastic element which accounts for stochastic considerations such as the probability of acquiring venture capital.

In step 1310, the algorithm determines whether it has executed the predetermined number of times. If the algorithm has not executed the predetermined number of times, control proceeds to step 1302 where the generative algorithm creates new objects representing new goods and services from the first adjacent objects chosen by the selection utility. If the algorithm has executed the predetermined number of times, the algorithm terminates. Upon termination, the generative operation 1300 yields a set of new goods and services to identify new niches, new growth opportunities and new locations of strategic competition.

As is known in the art, a variety of generative operations 1300 could be used to link objects and to compute the economic value of the adjacent objects including multi-criteria landscapes and multi-criteria landscapes as specified in a patent application which is currently under development titled, "A Method and System for Configuration Guidance, Organizational Simulation and Landscape Representation," attorney docket 009392-0009-999, the contents of which are herein incorporated by reference.

An additional analysis tool of Economic Web Sherpa simulates the effect of the entry of a new good or service into the economy by creating a corresponding object with attributes and behavior and by propagating the effect of the new object on the undirected graph representation G[V, E, δ] of the economic web model 104 using the Object Constructor 800, the SearchComplement operations 400, 600 and the SearchSubstitute operations 450, 650. Similarly, the analysis tool simulates the extinction of an existing good or service from the economy by propagating the effect of the object's extinction on the economic web model 104 using the Object Destructor 900.

The analysis tool also simulates the effect of changing an existing good or service by propagating the effect of the change on the undirected graph representation G[V, E, δ] of the economic web model 104 using the SearchComplement operations 400, 600 and the SearchSubstitute operations 450, 650. For example, the modification of an automobile tire enabling higher speeds around corners could lead to new complement relations with modified axles and with roads having a higher degree of curvature. Accordingly, the analysis tool also simulates technological co-evolution to identify new market niches, new growth opportunities and new locations of strategic competition While the above invention has been described with reference to certain preferred embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. A system for providing economic guidance to economic agents acting within an economy of economic agents, goods and services comprising:
   a plurality of economic objects characterizing the economic agents, the goods and the services in the economy;
   a plurality of graph operations wherein said graph operations determine relations among the economic agents, the goods and the services in the economy and construct a graph representation of the relations; and
   a plurality of analysis operations for determining features of the graph representation of the relations in the economy.

2. A system for providing economic guidance to economic agents acting within an economy of economic agents, goods and services as in claim 1 wherein said plurality of graph operations comprise a plurality of searching operations corresponding to said economic objects wherein said searching operations find functional relations with the economic agents, the goods and the services in the economy and construct a graph representation of the functional relations.

3. A system for providing economic guidance to economic agents acting within an economy of economic agents, goods and services as in claim 2 wherein said economic objects further comprise a corresponding plurality of attributes and behavior, said attributes and said behavior characterizing functionalities of the economic agents, the goods and the services in the economy.

4. A system for providing economic guidance to economic agents acting within an economy of economic agents, goods and services as in claim 3 wherein said searching operations comprise:
   a plurality of search complement operations for locating complementary objects of said economic objects having complementary ones of said attributes or said behavior; and
   a plurality of search substitute operations for locating substitute objects of said economic objects having substitute ones of said attributes or said behavior.

5. A system for providing economic guidance to economic agents acting within an economy of economic agents, goods and services as in claim 3 wherein said economic objects further comprise a corresponding plurality of construction operations, each of said construction operations creating a vertex representing a corresponding said economic object in the graph representation.

6. A system for providing economic guidance to economic agents acting within an economy of economic agents, goods and services as in claim 5 wherein each of said construction operations initiates a corresponding one of said searching operations.

7. A system for providing economic guidance to economic agents acting within an economy of economic agents, goods and services as in claim 5 further comprising a plurality of classes wherein said classes group said economic objects according to said attributes and said behavior.

8. A system for providing economic guidance to economic agents acting within an economy of economic agents, goods and services as in claim 7 further comprising a plurality of class hierarchy relations for defining a relation among said classes.

9. A system for providing economic guidance to economic agents acting within an economy of economic agents, goods and services as in claim 8 wherein said class hierarchy relations comprise an aggregation hierarchy relation defining said classes as assembly classes and component classes.

10. A system for providing economic guidance to economic agents acting within an economy of economic agents, goods and services as in claim 9 wherein said class hierarchy relations further comprise a generalization or inheritance hierarchy relation.

11. A system for providing economic guidance to economic agents acting within an economy of economic agents, goods and services as in claim 10 wherein said searching operations traverse said generalization or inheritance hierarchy relation to find the functional relations in the economy.

12. A system for providing economic guidance to economic agents acting within an economy of economic agents, goods and services as in claim 10 wherein said searching operations traverse said aggregation hierarchy to construct a plurality of subgraphs corresponding to the economic agents, said subgraphs representing the functional relations of the corresponding economic agents.

13. A system for providing economic guidance to economic agents acting within an economy of economic agents, goods and services as in claim 12 further comprising an assembly utility for assembling said subgraphs to construct the graph representation of the functional relations.

14. A system for providing economic guidance to economic agents acting within an economy of economic agents, goods and services as in claim 13 further comprising:
   a plurality of servers corresponding to the economic agents comprising:
      at least one mapping operation for mapping said economic objects and the graph representation to a database;
      at least one indexed collection for storing said economic objects and the graph representation; and
      at least one search system for finding the functional relations in the economy; and a communication network for communication between said plurality of servers.

15. A system for providing economic guidance to economic agents acting within an economy of economic agents, goods and services as in claim 14 wherein said search system comprises an extraction operation and an indexing operation for assembling and organizing respectively said economic objects and the graph representation from said database to said indexed collection.

16. A system for providing economic guidance to economic agents acting within an economy of economic agents, goods and services as in claim 15 wherein said search system further comprises:
   a query filter for parsing said search complement operations and said search substitute operations and for creating corresponding queries; and
   a search engine for searching said indexed collection for said complementary object and said substitute objects with said corresponding queries.

17. A system for providing economic guidance to economic agents acting within an economy of economic agents, goods and services as in claim 14 wherein said communication network is the World Wide Web.

18. A system for providing economic guidance to economic agents acting within an economy of economic agents, goods and services as in claim 14 wherein said search complement operations and said search substitute operations are stored procedures.

19. A system for providing economic guidance to economic agents acting within an economy of economic agents, goods and services as in claim 1 wherein said graph representation further comprises a plurality of vertices corresponding to said plurality of economic objects, said graph operations determine the relations by observing interactions among the economic agents, the goods and the services in the economy, and said graph operations create a plurality of edges in said graph representation from said relations.

20. A system for providing economic guidance to economic agents acting within an economy of economic agents, goods and services as in claim 1 wherein said analysis operations comprise a plurality of generative operations corresponding to said economic objects for generating new goods and new services from the graph representation of the relations in the economy to identify new market niches.

21. A system for providing economic guidance to economic agents acting within an economy of economic agents, goods and services as in claim 20 wherein said generative operations comprise a plurality of linking operations, said linking operations finding a plurality of functionally linkable adjacent objects of said economic objects and linking the adjacent objects to form combinations.

22. A system for providing economic guidance to economic agents acting within an economy of economic agents, goods and services as in claim 21 wherein said generative operations further comprises:
   a plurality of scoring operations for determining an economic value of said combinations; and
   a plurality of selecting operations for selecting some of said combinations having a maximal value for a selection objective.

23. A system for providing economic guidance to economic agents acting within an economy of economic agents, goods and services as in claim 22 wherein said selection objective is a multi-criteria objective.

24. A system for providing economic guidance to economic agents acting within an economy of economic agents, goods and services as in claim 22 wherein said scoring operations discount the economic value of said combinations to a present value.

25. A system for providing economic guidance to economic agents acting within an economy of economic agents, goods and services as in claim 22 wherein said selecting operators further comprise a plurality of stochastic elements, said stochastic elements account for a plurality of stochastic considerations said stochastic considerations comprising a probability of obtaining venture capital.

26. A system for providing economic guidance to economic agents acting within an economy of economic agents, goods and services as in claim 21 wherein said linking operations recursively find functionally linkable adjacent combinations of said combinations and links said adjacent combinations to form higher order combinations.

27. A system for providing economic guidance to economic agents acting within an economy of economic agents, goods and services as in claim 26 wherein said linking operations recursively execute to a predetermined depth.

28. A system for providing economic guidance to economic agents acting within an economy of economic agents, goods and services as in claim 21 wherein said generative operations recursively execute for a predetermined number of generations.

29. A system for providing economic guidance to economic agents acting within an economy of economic agents, goods and services as in claim 1 wherein said economic objects further comprise a corresponding plurality of destruction operations, each of said destruction operations destroying the functional relations of a corresponding said economic object in the graph representation and destroying the vertex representing said corresponding economic object in the graph representation.

30. A system for providing economic guidance to economic agents acting within an economy of economic agents, goods and services as in claim 1 wherein said analysis operators further comprise at least one simulator, said simulator modifying the graph representation by changing at least one of said economic objects to create at least one changed economic object and/or by adding at least one candidate object and by propagating an influence of said changed economic object and/or said candidate object through the graph representation.

31. A method for providing economic guidance to economic agents acting within an economy of economic agents, goods and services comprising the steps of:
   characterizing the economic agents, the goods and the services in the economy with a plurality of economic objects;
   determining relations among the economic agents, the goods and the services in the economy with a plurality of graph operations; and
   constructing a graph representation of the relations; and
   determining features of the graph representation of the relations in the economy with a plurality of analysis operations.

32. A method for providing economic guidance to economic agents acting within an economy of economic agents, goods and services as in claim 31 wherein said determining relations step further comprises the step of finding relations with the economic agents, the goods and the services in the economy with a plurality of searching operations.

33. A method for providing economic guidance to economic agents acting within an economy of economic agents, goods and services as in claim 32 wherein said characterizing step defines functionalities of the economic agents with a plurality of attributes and behavior.

34. A method for providing economic guidance to economic agents acting within an economy of economic agents, goods and services as in claim 33 wherein said finding relations step comprises the steps of:

locating complementary objects of the economic objects having complementary ones of the attributes or the behavior with a plurality of search complement operations; and locating substitute objects of said economic objects having substitute ones of said attributes or said behavior with a plurality of search substitute operations.

35. A method for providing economic guidance to economic agents acting within an economy of economic agents, goods and services as in claim 33 wherein said constructing a graph representation step comprises the step of creating a vertex representing a corresponding said economic object in the graph representation with a corresponding plurality of construction operations.

36. A method for providing economic guidance to economic agents acting within an economy of economic agents, goods and services as in claim 35 wherein said constructing a graph representation step further comprises the step of initiating a corresponding one of the searching operations.

37. A method for providing economic guidance to economic agents acting within an economy of economic agents, goods and services as in claim 35 wherein said characterizing step further comprises the step of grouping the economic objects according to the attributes and the behavior into a plurality of classes.

38. A method for providing economic guidance to economic agents acting within an economy of economic agents, goods and services as in claim 37 wherein said characterizing step further comprises the step of defining relations among the classes with a plurality of class hierarchy relations.

39. A method for providing economic guidance to economic agents acting within an economy of economic agents, goods and services as in claim 38 wherein said defining the relations step defines the classes as assembly classes and component classes into an aggregation hierarchy.

40. A method for providing economic guidance to economic agents acting within an economy of economic agents, goods and services as in claim 38 wherein said defining the relations step further defines the classes into a generalization or inheritance hierarchy.

41. A method for providing economic guidance to economic agents acting within an economy of economic agents, goods and services as in claim 40 wherein said finding the relations step further comprises the step of traversing the generalization or inheritance hierarchy.

42. A method for providing economic guidance to economic agents acting within an economy of economic agents, goods and services as in claim 40 wherein said constructing a graph representation step further comprises the step of constructing a plurality of subgraphs corresponding to the economic agents, the subgraphs representing the relations of the corresponding economic agents.

43. A method for providing economic guidance to economic agents acting within an economy of economic agents, goods and services as in claim 42 wherein said constructing a graph representation step further comprises the step of assembling the subgraphs to construct the graph representation of the relations.

44. A method for providing economic guidance to economic agents acting within an economy of economic agents, goods and services as in claim 43 further comprising the steps of:

mapping the economic objects and the graph representation to a database on a plurality of servers;

storing the economic objects and the graph representation into at least one indexed collection;

finding the relations in the economy from the indexed collection with at least one search system; and communicating between the servers with a communication network.

45. A method for providing economic guidance to economic agents acting within an economy of economic agents, goods and services as in claim 44 wherein said storing the economic objects and the graph representation step comprises the steps of:

assembling the economic objects and the graph representation from the database with an extraction operation; and organizing the economic objects and the graph representation into the indexed collections.

46. A method for providing economic guidance to economic agents acting within an economy of economic agents, goods and services as in claim 45 wherein said finding the relations in the economy step further comprises the steps of:

parsing the search complement operations and the search substitute operations and creating corresponding queries with a query filter; and searching the indexed collection for the complementary objects and the substitute objects with the corresponding queries using a search engine.

47. A method for providing economic guidance to economic agents acting within an economy of economic agents, goods and services as in claim 44 wherein said communication network is the World Wide Web.

48. A method for providing economic guidance to economic agents acting within an economy of economic agents, goods and services as in claim 44 wherein said searching the indexed collection for the complementary objects and the substitute objects step further comprises the step of assembling the search complement operations and the search substitute operations into stored procedures.

49. A method for providing economic guidance to economic agents acting within an economy of economic agents, goods and services as in claim 31 wherein said constructing a graph representation step further comprises the step of creating a plurality of vertices, observing interactions among the economic agents, the goods and the services in the economy to determine the relations, and creating a plurality of edges in the graph representation corresponding to said relations.

50. A method for providing economic guidance to economic agents acting within an economy of economic agents, goods and services as in claim 31 wherein said determining features step comprises the step of generating new goods and new services from the graph representation of the relations in the economy to identify new market niches with a plurality of generative operations corresponding to the economic objects.

51. A method for providing economic guidance to economic agents acting within an economy of economic agents, goods and services as in claim 50 wherein said generating new goods and new services step comprises the steps of:

finding a plurality of functionally linkable adjacent objects of the economic objects with a plurality of linking operations; and linking the adjacent objects to form combinations with the linking operations.

52. A method for providing economic guidance to economic agents acting within an economy of economic agents, goods and services as in claim 51 wherein said generating new goods and new services step further comprises the steps of:

determining an economic value of the combinations with a plurality of scoring operations; and selecting some of the combinations having the highest economic value with a plurality of selecting operations.

53. A method for providing economic guidance to economic agents acting within an economy of economic agents, goods and services as in claim 52 wherein said finding a plurality of functionally linkable adjacent objects step and said linking the adjacent objects step operate recursively to find functionally linkable adjacent combinations of the combinations and to links the adjacent combinations to form higher order combinations.

54. A method for providing economic guidance to economic agents acting within an economy of economic agents, goods and services as in claim 53 wherein said finding a plurality of functionally linkable adjacent objects step and said linking the adjacent objects step operate recursively to a predetermined depth.

55. A method for providing economic guidance to economic agents acting within an economy of economic agents, goods and services as in claim 53 wherein said determining an economic value of the combinations step comprises the step of discounting the economic value of the higher order combinations to a present value.

56. A method for providing economic guidance to economic agents acting within an economy of economic agents, goods and services as in claim 52 wherein said generating new goods and new services step executes recursively for a predetermined number of generations.

57. A method for providing economic guidance to economic agents acting within an economy of economic agents, goods and services as in claim 31 wherein said constructing a graph representation step further comprises the steps of:

destroying the relations of a corresponding said economic object in the graph representation with a corresponding plurality of destruction operations; and destroying the vertex representing the corresponding economic object in the graph representation with the destruction operation.

\* \* \* \* \*